Jan. 25, 1955 R. C. HIGLEY 2,700,234
LAND-LEVELING AND SCARIFYING APPARATUS
Original Filed Jan. 20, 1947 2 Sheets-Sheet 1
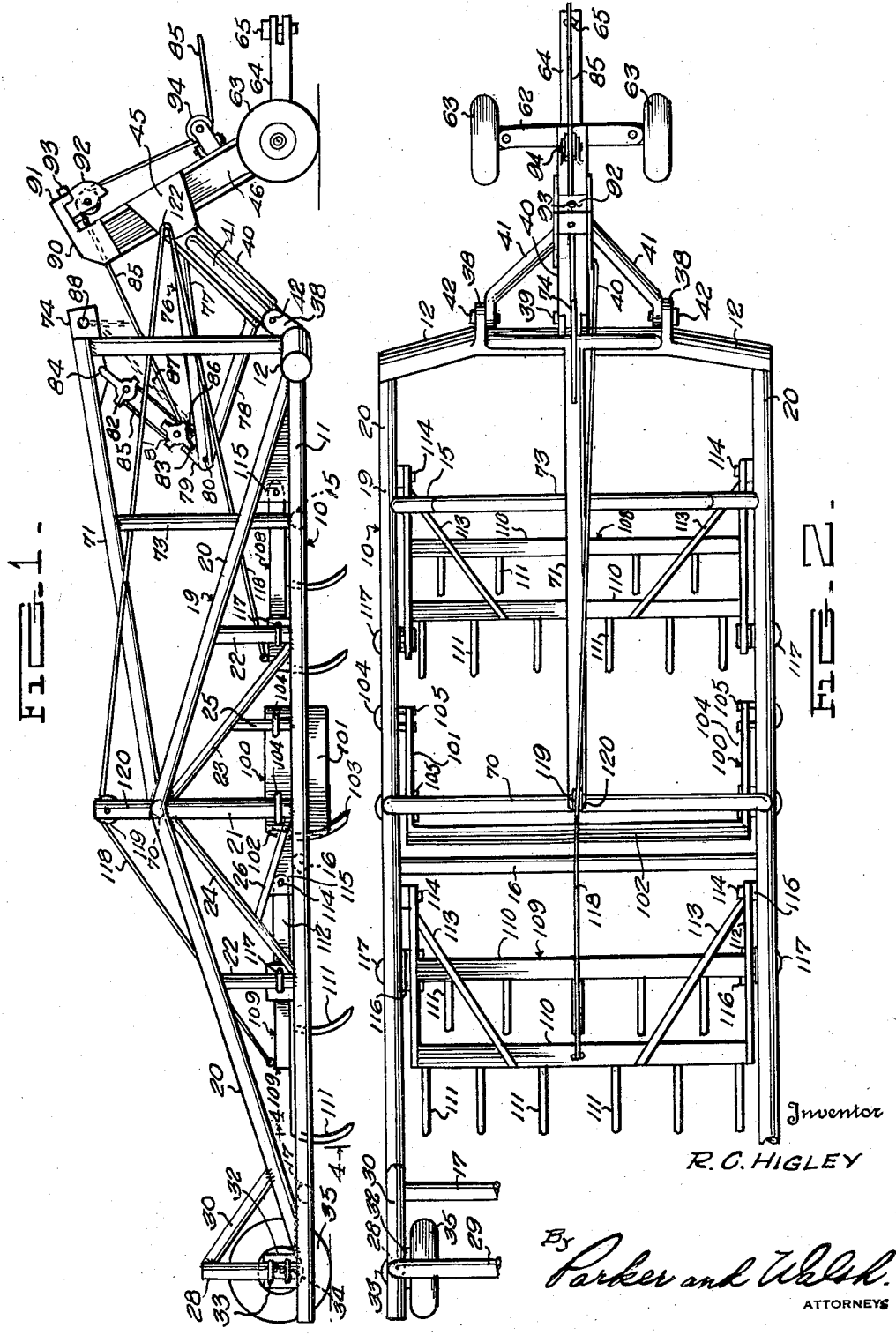
Inventor
R. C. HIGLEY
By Parker and Walsh
ATTORNEYS

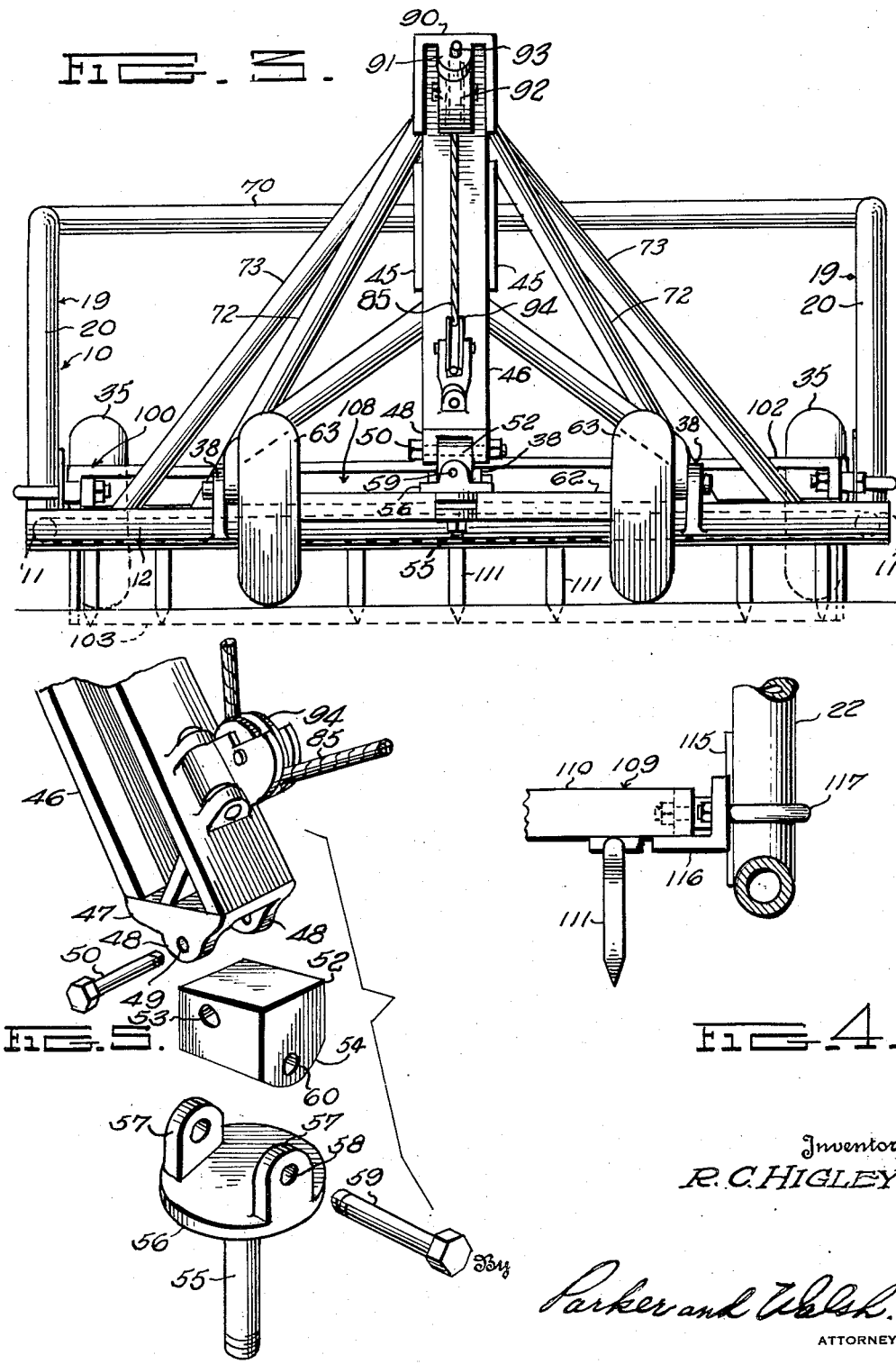

United States Patent Office 2,700,234
Patented Jan. 25, 1955

2,700,234

LAND-LEVELING AND SCARIFYING APPARATUS

Rolland C. Higley, Tucumcari, N. Mex.

Original application January 20, 1947, Serial No. 722,999. Divided and this application January 14, 1949, Serial No. 70,991

17 Claims.   (Cl. 37—145)

This invention relates to a land-leveling and scarifying apparatus and is a division of my co-pending application Serial No. 722,999, filed January 20, 1947.

In my co-pending application referred to, I have disclosed a novel land plane whereby ground may be leveled to remove irregularities in the surface of the ground, and particularly farm lands, to facilitate farming, to minimize erosion, etc. Such apparatus comprises a novel type of frame adapted to be pulled behind a tractor and provided with a planing device movable over the ground to cut off high spots in the ground and to leave dirt in low spots as the leveling blade passes thereover, and the frame is so adjustable as to vary the depth of the cut and to swing the planing device entirely out of contact with the ground, when not in use.

In many uses of the apparatus, relatively hard ground is encountered, which renders it quite difficult for the planing device to slice off the tops of high places, and it is an important object of the present invention to combine with the planing device a novel type of scarifier for breaking up the ground ahead of the planing device to facilitate the operation of the latter.

A further object is to utilize the same novel supporting frame for the planing device and for the scarifier and to employ the same means for raising and lowering these devices relative to the surface of the ground.

A further object is to provide a novel supporting frame for both the planing device and the scarifying device which is supported at three points in its travel over the ground to substantially eliminate lateral tilting of the operating devices incident to the passing of the front supporting means over the ground.

Other objects and advantages of the invention will become apparent during the course of the following description.

In the drawings I have shown one embodiment of the invention. In this showing:

Figure 1 is a side elevation of the apparatus,

Figure 2 is a plan view of the same, parts being broken away,

Figure 3 is a front elevation of the apparatus,

Figure 4 is an enlarged fragmentary detail sectional view on line 4—4 of Figure 1, and Figure 5 is a detail perspective view of the forward supporting elements for the apparatus and associated elements, the parts being shown separated.

For a complete understanding of the operation of the apparatus, the entire structure is described together with its operation. It will be understood that the planing device per se and in combination with the supporting frame, etc., are claimed in my co-pending application and that the present application relates to the scarifying means, the relation of such means to the supporting structure therefor, a combination of the scarifying and leveling means with each other and with the supporting frame structure, etc.

Referring to Figures 1 and 2, the numeral 10 designates the supporting frame of the apparatus as a whole. This frame comprises lower parallel longitudinally extending frame members 11 which are preferably tubular in form, and these members are connected at their forward ends by a relatively heavy tubular cross member 12 preferably welded to the members 11. The longitudinal frame members 11 are connected by transverse braces 15, 16 and 17, these braces also preferably being tubular and welded at their ends to the side members 11.

At each side of the apparatus, truss frames 19 are arranged, and each of these frames comprises frame members 20 welded at their remote ends to the frame members 11 and being inclined upwardly toward their adjacent ends. The latter ends of the truss frame members 20 are welded to each other and to a vertical brace 21 arranged at each side of the apparatus. The truss frame further comprises intermediate vertical braces 22, and any additional bracing which appears advisable, such as diagonal braces 23 and 24, a supplemental vertical brace 25 and a supplemental angle brace 26.

Adjacent the rear end of each longitudinal frame member 11 is arranged a vertical post 28, and the upper ends of these posts are connected by a transverse brace 29. Each post 28 is braced with respect to the adjacent truss member 20 as at 30. A supporting block 32 is secured to each post 28 by U-bolts 33, and each block 32 carries an axle 34 rotatably supporting a wheel 35. These wheels are widely spaced as indicated in Figures 2 and 3, and preferably are arranged adjacent the side frame members 11.

The forward cross member 12 is provided with forwardly and upwardly extending ears 38 and to the central ears is pivotally connected as at 39 a normally upwardly and forwardly extending supporting member 40 preferably of I-beam section. This beam is provided with rearwardly diverging brace members 41 welded at their forward ends to the web of the member 40 and pivotally connected at their rear ends as at 42 to the ears 38. The supporting structure comprising the elements 40 and 41 accordingly supports the forward end of the frame 10, and the parts are normally arranged in the relative positions shown in Figure 1 during the operation of the apparatus, as will become apparent.

The forward end of the supporting member 40 is provided with heavy side plates 45 welded thereto and extending on opposite sides of and welded to a heavy supporting post 46, also preferably formed of I-beam section. The lower end of the post 46 (Figure 5) is provided with a foot 47 preferably welded thereto and provided with depending ears 48 apertured as at 49 to receive a relatively heavy pivot pin 50. The ears 48 straddle a universal block 52 apertured transversely of the apparatus as at 53 to receive the pivot pin 50 and having its lower side arcuately curved, as at 54.

The load on the post 46 is supported by a heavy king pin 55 having a heavy disc 56 at its upper end provided with ears 57 having apertures 58 adapted to receive a heavy pivot pin 59. This pin is also received in an aperture 60 in the universal block 52.

The king pin 55 is mounted in an axle structure 62 carrying wheels 63 at its opposite ends. The axle 62 carries a forwardly extending draft tongue 64 adapted for connection by a bolt 65 with a tractor or other draft apparatus for pulling the mechanism over the ground, the lower curved side 54 of the block 52 permitting lateral swinging movement of the disc 56 therearound.

The apexes of the truss members 20 are connected by a transverse brace 70 (Figures 2 and 3) and a forwardly and upwardly extending relatively long arm 71 is welded at its rear end to the brace 70 substantially centrally thereof. This arm has its forward portion rigidly fixed with respect to the frame 10 by a pair of inverted V-shaped supports 72 and 73, the former of which is welded at its lower ends to the cross member 12 and the latter of which is welded at its ends to the cross brace 15. The forward end of the member 71 is slotted to receive a heavy plate 74 welded to the member 71.

A boom 76 is carried by the load supporting member 40. This boom comprises an arm 77 welded at its forward end to the member 40 and a brace 78 welded to the member 40 adjacent the lower end thereof. The free ends of the members 77 and 78 are secured to each other, and link means 79 is pivoted as at 80 to the joined ends of the members 77 and 78. A pair of pulley blocks 81 and 82 are connected respectively to the link means 79 and plate 74 as at 83 and 84.

A cable 85 is received around the pulleys of the blocks 81 and 82, and one end of this cable may be fixed to the arm 77 by means of a lug 86 carried thereby. This lug is also connected to the lower end of a chain 87, the upper end of which passes through a key hole slot 88 in the plate 74. This slot is of the conventional type for engaging chains and need not be referred to or illustrated in detail. It will be apparent that the chain 87 limits downward movement of the member 76 relative to the plate 74, and this downward limit of movement may be adjusted by hooking selected links of the chain 87 in the key hole slot 88.

The post 46 is provided at its upper end with a head 90 projecting forwardly thereof and provided with depending ears 91 to which a pulley block 92 is pivoted as at 93. The other end of the cable 85 passes around the pulley of the block 92, thence downwardly around a pulley 94 carried by the post 46 near its lower end, and then extends forwardly for connection with a suitable winch (not shown) carried by the tractor to which the apparatus is connected.

A land planing element indicated as a whole by the numeral 100 is carried by the apparatus intermediate the ends thereof. The element 100 comprises side walls 101 lying adjacent the side frame members 10 and connected at their rear edges by a rear arcuate wall 102 the lower edge 103 of which (Figure 3) extends below the bottom of the side walls 101. It will be noted that the element 100 has no bottom wall and operates forwardly over the ground to scrape dirt from the high places and pocket it between the side walls 101 and forwardly of the wall 102 so that the dirt thus pocketed is free for deposit in any low points over which the apparatus moves. The side walls 101 are rigidly fixed to the frame of the apparatus by U-bolts 104 extending around the vertical braces 21 and 25 and having nuts 105 threaded on their inner ends.

The apparatus may be used solely with the land planing element 100. However, it is preferably employed in conjunction with a scarifier arranged forwardly of the element 100, and may be used with a turrower following the element 100. The scarifier and furrower are indicated as a whole respectively by the numerals 108 and 109, and since they may be identical in construction, only one need be referred to in detail. Each of these units, as shown in Figures 1 and 2, comprises preferably a pair of transverse bars 110 each of which is provided with downwardly extending curved cutter teeth 111, the teeth of the two bars 110 preferably being staggered relative to each other. The bars 110 are carried by side members 112 which may be braced relative to the bars 110 as at 113. The forward ends of the side members 112 are pivoted as at 114 to plates 115 carried by the side frame members 10. Each of the side members 112 is engageable with an angle bracket 116 adjustably fixed with respect to the adjacent vertical braces 22 by U-bolts 117.

Means is provided for swinging the scarifying and furrowing units upwardly when the forward end of the apparatus is elevated. One of the cross members 110 of each of these units is connected to the rear end of a cable 118, and the cable associated with the furrowing unit passes upwardly and forwardly and thence around a pulley 119 carried by a central upstanding post 120 secured at its lower end to the cross brace 70. The forward ends of the cables 118 of both of the units 108 and 109 have fixed connection relative to the post 46, for example by being connected as at 122 to one of the plates 45.

*Operation*

The apparatus normally operates with the parts substantially in the position shown in Figure 1. The scarifier 108 functions to cut through the surface of the ground and thus loosens the soil to facilitate the planing action of the cutting edge 103. The soil cut by such edge gathers within the side walls 101 and rear wall 102 and since the planing element 100 is bottomless, the rear wall 102 merely pushes the dirt over the ground in contact therewith as the apparatus moves forwardly.

The cutting edge 103 is vertically adjusted by clamping the bolts 104 in the desired position. The relatively raised places on the surface of the ground will be planed off and as the dirt accumulates within the planing device 100, it tends to slide downwardly and forwardly from the upper end of the wall 102. The capacity of the device 100 is substantial and after a comparatively short operation of the device an adequate quantity of dirt will be retained therein to fill in any low spots over which the apparatus moves. It will be apparent that as such spots are reached, the dirt within the device 100 merely settles down into the low spots and is sliced off by the cutting edge 103 at the same level as the ground previously passed over. Thus the apparatus operates to cut off the surface of the ground wherever there are rises therein and to deposit the dirt in the low areas to thus effectively level off the ground to prepare it for farming, to prevent or minimize erosion, etc. The action of the device is particularly effective over relatively flat land as will be apparent.

To better prepare the soil for farming, the furrower 109 is preferably employed, thus minimizing the amount of labor which must be expended later in preparing the ground for planting. While the apparatus is primarily a ground planer, it will be apparent, therefore, that it may be used in conjunction with other land working tools. Regardless of the use of the furrower, it is preferred that the scarifier be employed to break up the surface of the ground and thus permit the planing device 100 to operate with a minimum expenditure of power.

It will be noted that the wheels 35 at the rear of the apparatus are relatively widely spaced but lie within the transverse limits of the planing device 100. The wheels 35, following behind the planing device, accordingly operate over relatively level ground and stabilize the planing device as to its lateral position, maintaining it quite accurately in horizontal position to prevent one or the other of the ends of the planing device from digging too deep into the ground.

The wheels 63 at the forward end of the apparatus are relatively closely positioned, as shown in Figure 2, and thus the wheels 35 do not track behind the wheels 63. Attention is invited to the universal supporting of the lower end of the post 46 relative to the axle 62. This provides the highly advantageous result of permitting the widely spaced rear wheels 35 to hold the planing device 100 level regardless of the angularity of the axle 62.

In this connection, it is pointed out that the rear wheels 35 travel over planed ground while the wheels 63 precede the planing device over the ground and thus are more subject to variation in their relative vertical positions in passing over ridges, hollows, etc., in the surfaces of the ground. Assuming that one wheel 63 drops into a ridge, furrow or the like, the axle 62 will immediately assume an angular position which may be substantial. The universal connection of the post 46 with the axle 62, as shown in Figure 5, however, permits the post 46 to remain in a vertical plane without transmitting any twisting forces to the frame 10 and associated parts. Accordingly the cutting edge 103 of the planing device remains almost exactly horizontal at all times.

Inasmuch as the planing edge 103 is arranged much closer to the rear wheels 35 than to the front wheels 63, variations in the vertical positions of the wheels 63 are reflected in a much shorter vertical movement of the cutting edge 103. For example, assuming that one of the wheels 63 should drop into a hole 10 inches deep, the center of the axle 62 will drop downwardly 5 inches. With the proportioning of the parts as shown, and as used in actual practice, this will result in a vertical movement of the cutting edge 103 by only about 2 inches. However, it is also pointed out that the frame of the apparatus lies relatively close to the ground and a substantial drop in the position of the universal connection in Figure 5 incident to the dropping of one of the front wheels into a hole or ridge will result in the contacting of the forward end of the frame 10 with the ground 20 to limit downward movement of the cutting edge 103. Under such conditions, the frame 10 acts as a skid and in the preferred operation of the apparatus any downward movement of the cutting edge 103 is limited to about 1 inch. Under all conditions, therefore, the apparatus operates with remarkable accuracy in smoothly planing the ground.

The adjustment of the parts, of course, will depend largely upon the nature of the ground being leveled. The planing device 100 is vertically adjustable by means of the U-bolts 104, as stated. The scarifier and furrower also are vertically adjustable by loosening the U-bolts 117 and raising and lowering the angle brackets 116 (Figure 4).

In moving the apparatus to and from a field of operation, the front end of the frame 10 and associated elements are elevated. A suitable windlass (not shown) on the tractor is operated to wind the forward end of the cable 85. This operation pulls forwardly on the cable and exerts a forward and upward pull on the sheave block 81. This action elevates the rear end of the structure comprising the posts 46, supporting member 40, braces 41 and arms 77 and 78. Since the entire load of the forward end of the frame 10 is supported by the pivot pins 39 and 42 (Figures 1 and 2) it will be apparent that this entire rigid structure will be swung forwardly about the axis of the pivot pin 50 (Figure 5) the post 46 moving substantially to a vertical position and elevating the forward end of the frame 10 and associated elements a substantial distance.

With the post 46 swung to a substantially vertical position, the elevation of the forward end of the frame 10 will be more than sufficient to move the cutting edge 103 to a position several inches above the surface of the ground. At the same time that this operation takes place, it will be noted that the swinging of the post 46 forwardly exerts a pull on the cables 118, and accordingly the scarifier and furrower will be swung upwardly about their pivots 114 to be held by the cables 118 wholly above the surface of the ground. The apparatus can then be transported by the tractor to and from its site of operation without contact of the working tools with the ground.

From the foregoing it will be apparent that the present apparatus is highly suited for efficient use in leveling uneven ground, the planing device 100, with the parts properly adjusted, accumulating dirt therein and pocketing a substantial amount of dirt ready for use in filling in any low spots encountered over the surface of the ground. The higher areas are planed off by the cutting edge 103. The wide spacing of the wheels 35 without extending them beyond the transverse limits of the planing device provides an arrangement whereby the cutting or planing device remains in horizontal position. The wheels 35 always run over planed ground and thus remain substantially at the same level. Any swinging movement of the axle 63 is prevented from being transmitted to the earth working tools by means of the universal connection shown in Figure 5.

It also will be apparent that the present apparatus provides novel means operable through the single control cable 85 for rendering the apparatus operative or inoperative regardless of the number of tools carried by the frame 10. The raising of the forward end of the frame directly lifts the cutting edge 103 out of contact with the ground, while the forward swinging of the post 46 simultaneously and automatically swings upwardly to operative position any working tools other than the planing device 100 which are carried by the frame. The apparatus has been found so efficient in operation that it not only performs its work with a high degree of accuracy but permits a much greater area of ground to be planed in a given length of time than can be done with mechanisms of a similar character.

I claim:

1. A land planing apparatus comprising a horizontal frame having forward and rear ends, spaced supporting wheels for the rear end of said frame, universal supporting means for the forward end of said frame, a cutting device fixed to said frame substantially transversely thereof and comprising a rear wall having a lower cutting edge and side walls extending forwardly from the ends of said rear walls and spaced apart a distance greater than the spacing of said supporting wheels, said rear and side walls being of substantial depth, and a scarifier carried by said frame forwardly of said planing device and comprising depending teeth engageable with the ground to scarify and loosen it ahead of said cutting edge, the forward end of said frame being disposed in close proximity to the ground whereby when said universal supporting means drops a predetermined amount due to unevenness of the ground the forward end of said frame will engage the ground and act as a skid to limit the cutting depths of said cutting device and said scarifier.

2. A land planing apparatus comprising a frame having forward and rear ends and including a cross bar at the forward end normally spaced above the ground level, relatively widely spaced supporting wheels at the rear end of said frame, universal supporting means for the forward end of said frame centrally of the width thereof, said wheels and said universal supporting means supporting said frame for movement over the ground in relatively close proximity thereto, a land planing device carried by said frame and comprising a rear wall having a lower horizontal cutting edge and side walls adjacent the ends of said rear wall, the bottom of said device being open for the direct movement over the ground of earth cut by said cutting edge and pocketed within said device, and a scarifier carried by said frame forwardly of said planing device and comprising depending teeth engageable with the ground to scarify and loosen it ahead of said cutting edge, said forward cross bar being constructed and arranged to engage the ground incident to variations in the vertical position of said universal supporting means due to unevenness of the ground to limit downward movement of the forward end of said frame and thus of said land planing device.

3. A land planing apparatus comprising a horizontal frame having forward and rear ends, spaced supporting wheels for the rear end of said frame, universal supporting means for the forward end of said frame, a cutting device fixed to said frame and comprising a rear wall having a lower cutting edge and side walls spaced apart a distance greater than the spacing of said supporting wheels, means pivotally connecting said frame to said universal supporting means, a cable associated with said connecting means and adapted to be pulled to elevate the forward end of said frame relative to said universal supporting means, a scarifier carried by said frame forwardly of said planing device and comprising depending teeth engageable with the ground to scarify and loosen it ahead of said cutting edge, and means connecting said scarifier to said connecting means to elevate said scarifier relative to said frame upon elevation of the forward end of said frame.

4. A land planing apparatus comprising a frame having forward and rear ends and including a cross bar at the forward end, relatively widely spaced supporting wheels at the rear end of said frame, universal supporting means for the forward end of said frame centrally of the width thereof, said wheels and said universal supporting means supporting said frame for movement over the ground in relatively close proximity thereto and said forward cross bar limiting downward movement of the forward end of said frame incident to variations in the vertical position of said universal supporting means, a land planing device carried by said frame and comprising a rear wall having a lower horizontal cutting edge and side walls, the bottom of said device being open for the direct movement over the ground of earth cut by said cutting edge and pocketed within said device, means pivotally connecting said frame to said universal supporting means, a cable associated with said connecting means and adapted to be pulled to elevate the forward end of said frame relative to said universal supporting means, a scarifier carried by said frame forwardly of said planing device and comprising depending teeth engageable with the ground to scarify and loosen it ahead of said cutting edge, and means connecting said scarifier to said connecting means to elevate said scarifier relative to said frame upon elevation of the forward end of said frame.

5. A land planing apparatus comprising a frame having forward and rear ends, relatively widely spaced supporting wheels for the rear end of said frame, a pair of relatively closely arranged wheels forwardly of said frame, connecting means between the forward end of said frame and said forward wheels comprising a universal connection whereby said forward wheels are laterally tiltable without communicating tilting movement to said frame, means pivotally connecting said connecting means to said frame, a boom, and block and tackle means between said boom and the forward part of said frame for exerting a pull on said boom to swing it and vertically lift the pivotal connection between said connecting means and said frame to elevate the latter, a cutting device fixed to said frame intermediate the ends thereof and comprising a rear wall having a lower cutting edge and side walls adjacent the ends of said rear wall and spaced apart a distance greater than the spacing of said rear supporting wheels, the bottom of said device being open for the direct movement over the ground of earth cut by said cutting edge and pocketed within said device, and a scarifier carried by said frame forwardly of said cutting device.

6. A land planing apparatus comprising a frame having forward and rear ends, relatively widely spaced supporting wheels for the rear end of said frame, a pair of relatively closely arranged wheels forwardly of said frame, connecting means between the forward end of said frame and said forward wheels comprising a universal connection whereby said forward wheels are laterally tiltable without communicating tilting movement to said frame, means pivotally connecting said connecting means to said frame, a boom, and block and tackle means between said boom and the forward part of said frame for exerting a pull on said boom to swing it and vertically lift the pivotal connection between said connecting means and said frame to elevate the latter, a cutting device fixed to said frame intermediate the ends thereof and comprising a rear wall having a lower cutting edge and side walls spaced apart a distance greater than the spacing of said rear supporting wheels, a scarifier pivotally connected to said frame forwardly of said cutting device, and means connecting said scarifier to said connecting means to swing said scarifier upwardly upon swinging movement of said boom.

7. A land planing apparatus comprising a frame having forward and rear ends, relatively widely spaced supporting wheels for the rear end of said frame, a pair of relatively closely arranged wheels forwardly of said frame, an axle connecting said last named wheels, a universal joint connected to said axle centrally thereof, a normally upwardly and rearwardly extending post connected at its lower end to said universal joint, means including a pivotal connection between said post and the forward end of said frame to support the latter relative to said post, and means including a pulley and cable device for exerting a force between said frame and said post for swinging the latter upwardly and forwardly to elevate said pivotal connection together with the forward end of said frame, a cutting device fixed to said frame intermediate the ends thereof and comprising a rear wall having a lower cutting edge and side walls spaced apart a distance greater than the spacing of said rear supporting wheels, a scarifier arranged forwardly of said cutting device, means for pivotally supporting the forward end of said scarifier relative to said frame, means for limiting movement of the rear end of said scarifier, and a flexible element connecting the rear end of said scarifier to said post whereby swinging movement of the latter will elevate the rear end of said scarifier.

8. A land leveling apparatus comprising a supporting frame having forward and rear ends, means for supporting said frame for movement over the ground, a cutting blade fixed to said frame and having a substantially horizontal lower cutting edge, a scarifier carried by said frame forwardly of said cutting device, means for elevating the forward end of said frame relative to said supporting means to lift said planing device and said scarifier out of engagement with the ground, and means operable by said elevating means for simultaneously effecting further lifting of said scarifier with respect to said frame.

9. A land leveling apparatus comprising a supporting frame having forward and rear ends, spaced supporting wheels for the rear end of said frame, means for supporting the forward end of said frame for movement over the ground, a land planing device fixed to said frame and extending transversely thereof at a point remote from the forward end of said frame, a scarifier carried by said frame forwardly of said planing device, means for elevating the forward end of said frame relative to said supporting means to lift said planing device and said scarifier out of engagement with the ground, and means operable by said elevating means for simultaneously effecting further lifting of said scarifier with respect to said frame.

10. A land leveling apparatus comprising a supporting frame having forward and rear ends, spaced supporting wheels for the rear end of said frame, means for supporting the forward end of said frame for movement over the ground, a land planing device fixed to said frame and extending transversely thereof at a point remote from the forward end of said frame, a scarifier carried by said frame forwardly of said planing device, means carried by said frame and vertically adjustable relative thereto to engage said scarifier and limit the depth of penetration of said scarifier into the ground, means for elevating the forward end of said frame relative to said supporting means therefor to lift said planing device and scarifier out of contact with the ground, and means operable by said elevating means for lifting said scarifier a greater distance upwardly than it would be moved by said frame when the forward end thereof is moved upwardly by said elevating means.

11. A land leveling apparatus comprising a horizontal frame having forward and rear ends, spaced supporting wheels for the rear end of said frame, means for supporting the forward end of said frame for movement over the ground, a land planing device carried by said frame and extending transversely thereof at a point remote from the forward end of said frame, a scarifier frame having forward and rear ends the former of which is pivotally connected to said frame, scarifying elements carried by the rear end of said scarifier frame forwardly of said planing device, means carried by said supporting frame and vertically adjustable relative thereto for limiting downward movement of the rear end of said scarifier frame to limit the depth of penetration of said scarifying elements into the ground, and separate means for swinging the rear end of said scarifier frame upwardly to lift said scarifying elements out of contact with the ground, the forward end of said frame being disposed in close proximity to the ground whereby when said means for supporting same drops a predetermined amount due to unevenness of the ground, said forward end of the frame will engage the ground and act as a skid to limit the cutting depths of said land planing device and said scarifying elements.

12. A land leveling apparatus comprising a horizontal frame having forward and rear ends, spaced supporting wheels for the rear end of said frame, means for supporting the forward end of said frame for movement over the ground, a land planing device carried by said frame and extending transversely thereof at a point remote from the forward end of said frame, a scarifier frame having forward and rear ends the former of which is pivotally connected to said frame, scarifying elements carried by the rear end of said scarifier frame forwardly of said planing device, means carried by said supporting frame and vertically adjustable relative thereto for limiting downward movement of the rear end of said scarifier frame to limit the depth of penetration of said scarifying elements into the ground, means for elevating the forward end of said frame relative to said supporting means therefor to lift said planing device out of contact with the ground, and means operative upon operation of said elevating means for swinging the rear end of said scarifier frame upwardly to lift said scarifying elements out of contact with the ground.

13. A land leveling apparatus comprising a horizontal frame having forward and rear ends, spaced supporting wheels for the rear end of said frame, means for supporting the forward end of said frame for movement over the ground, a land planing device carried by said frame and extending transversely thereof at a point remote from the forward end of said frame, a scarifier frame having forward and rear ends the former of which is pivotally connected to said frame, scarifying elements carried by the rear end of said scarifier frame forwardly of said planing device, means carried by said supporting frame and vertically adjustable relative thereto for limiting downward movement of the rear end of said scarifier frame to limit the depth of penetration of said scarifying elements into the ground, means for effecting relative movement between the forward end of said supporting frame and said supporting means therefor to elevate said planing device out of engagement with the ground, and means connected between said supporting means for the forward end of said supporting frame and the rear end of said scarifier frame for swinging the latter upwardly to lift said scarifying elements out of contact with the ground upon said relative movement between the forward end of said supporting frame and said supporting means therefor.

14. A land leveling apparatus comprising a horizontal frame having forward and rear ends, spaced supporting wheels for the rear end of said frame, wheeled supporting means for the forward end of said frame, universal means connecting the forward end of said supporting frame to said wheeled supporting means, a planing device carried by said supporting frame and extending horizontally transversely thereof at a point remote from the forward end of said frame, said planing device having a horizontal lower cutting edge, a scarifier frame having forward and rear ends mounted forwardly of said planing device, means pivotally connecting the forward end of said scarifier frame to said supporting frame, depending scarifying elements carried by the rear end of said scarifier frame, vertically adjustable means carried by said supporting frame and engaging beneath the rear end of said scarifier frame to limit downward movement of the latter and thus limit the depth of penetration of said scarifying elements into the ground, means for swinging said wheeled supporting means relative to the forward end of said supporting frame to lift said planing device from contact with the ground, and means comprising a cable having connection with said wheeled supporting means and the rear end of said scarifier frame to swing the latter upwardly and lift said scarifying elements out of engagement with the ground upon said swinging of said wheeled supporting means.

15. A land leveling apparatus comprising a horizontal frame having forward and rear ends, spaced supporting wheels for the rear end of said frame, wheeled supporting means for the forward end of said frame, universal means connecting the forward end of said supporting frame to said wheeled supporting means, a planing device carried by said supporting frame and extending horizontally transversely thereof at a point remote from the forward end of said frame, said planing device having a horizontal lower cutting edge, a pair of earth-working units arranged respectively forwardly and rearwardly of said planing device, each unit comprising a frame pivotally connected at its forward end to said supporting frame and provided at its rear end with depending earth-working elements, means for swinging said wheeled supporting means relative to the forward end of said supporting frame to elevate the latter and lift said planing device out of engagement with the ground, and means operative upon such swinging of said wheeled support for simultaneously raising the rear ends of the frames of said earth-working units.

16. A land leveling apparatus comprising a horizontal frame having forward and rear ends, spaced supporting wheels for the rear end of said frame, wheeled supporting means for the forward end of said frame, universal means connecting the forward end of said supporting frame to said wheeled supporting means, a planing device carried by said supporting frame and extending horizontally transversely thereof at a point remote from the forward end of said frame, said planing device having a horizontal lower cutting edge, a pair of earth-working units arranged respectively forwardly and rearwardly of said planing device, each unit comprising a frame pivotally connected at its forward end to said supporting frame and provided at its rear end with depending earth-working elements, means for swinging said wheeled supporting means relative to the forward end of said supporting frame to elevate the latter and lift said planing device out of engagement with the ground, and a cable connected at its ends respectively to the rear ends of the frames of said units, said cable intermediate its ends being connected to said wheeled supporting means whereby, upon relative movement between said wheeled supporting means and the forward end of said supporting frame, said cable is pulled to lift the rear ends of the frames of said unit.

17. A land working apparatus comprising a horizontal frame having forward and rear ends, means for supporting said frame for movement over the ground, an earth-working unit, means pivotally connecting the forward end of said earth-working unit to said horizontal frame, earth-working elements depending from the rear end of said unit, vertically adjustable stop means carried by said horizontal frame and engageable with the rear end of said unit to limit downward swinging movement thereof and penetration of said elements into the ground, and means for swinging the rear end of said unit upwardly away from said stop means to disengage said elements from the ground, the forward end of said frame being disposed in close proximity to the ground whereby when the frame supporting means move downwardly a predetermined amount due to unevenness of the ground the forward end of the frame will engage the ground and act as a skid to limit penetration of said earth-working elements thereinto.

References Cited in the file of this patent

UNITED STATES PATENTS

| Number | Name | Date |
|---|---|---|
| 537,707 | Neel | Apr. 16, 1895 |
| 899,215 | Godley | Sept. 22, 1908 |
| 1,088,757 | Westmoreland | Mar. 3, 1914 |
| 1,437,654 | Hast | Dec. 5, 1922 |
| 1,460,585 | Howe et al. | July 3, 1923 |
| 1,575,814 | Burson | Mar. 9, 1926 |
| 1,639,182 | Henry | Aug. 16, 1927 |
| 1,797,288 | Gustafson | Mar. 24, 1931 |
| 1,833,878 | Adams | Nov. 24, 1931 |
| 1,854,368 | Davis | Apr. 19, 1932 |
| 1,915,844 | York et al. | June 27, 1933 |
| 1,941,833 | Gustafson | Jan. 2, 1934 |
| 1,963,665 | Le Tourneau | June 19, 1934 |
| 2,176,503 | Leppert | Oct. 17, 1939 |
| 2,210,223 | Taylor | Aug. 6, 1940 |
| 2,277,889 | Shumaker | Mar. 31, 1942 |
| 2,330,113 | Daniels | Sept. 21, 1943 |